United States Patent
Tian et al.

(10) Patent No.: US 11,269,782 B2
(45) Date of Patent: Mar. 8, 2022

(54) ADDRESS SPACE IDENTIFIER MANAGEMENT IN COMPLEX INPUT/OUTPUT VIRTUALIZATION ENVIRONMENTS

(71) Applicant: INTEL CORPORATION, Santa Clara, CA (US)

(72) Inventors: Kun Tian, Shanghai (CN); Xiao Zheng, Shanghai (CN); Ashok Raj, Portland, OR (US); Sanjay Kumar, Hillsboro, OR (US); Rajesh Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/772,765

(22) PCT Filed: Mar. 28, 2018

(86) PCT No.: PCT/CN2018/080862
§ 371 (c)(1),
(2) Date: Jun. 12, 2020

(87) PCT Pub. No.: WO2019/183831
PCT Pub. Date: Oct. 3, 2019

(65) Prior Publication Data
US 2021/0004334 A1    Jan. 7, 2021

(51) Int. Cl.
*G06F 12/1036* (2016.01)
*G06F 9/455* (2018.01)
*G06F 12/1081* (2016.01)

(52) U.S. Cl.
CPC ...... *G06F 12/1036* (2013.01); *G06F 9/45558* (2013.01); *G06F 12/1081* (2013.01);
(Continued)

(58) Field of Classification Search
CPC .................................................. G06F 12/1036
(Continued)

(56) References Cited

U.S. PATENT DOCUMENTS 6,412,043 B1 *   6/2002   Chopra ............... G06F 9/30087
                                                     711/118
7,409,487 B1 *   8/2008   Chen ................... G06F 12/1036
                                                     711/6
(Continued)

FOREIGN PATENT DOCUMENTS

CN         103777926 A         5/2014
CN         107526693 A         12/2017

OTHER PUBLICATIONS

International Preliminary Reporton Patentability, PCT App. No. PCT/CN2018/080862, dated Oct. 8, 2020, 5 pages.
(Continued)

*Primary Examiner* — Titus Wong
(74) *Attorney, Agent, or Firm* — Nicholson De Vos Webster & Elliott LLP

(57) ABSTRACT

Embodiment of this disclosure provides a mechanism to extend a workload instruction to include both untranslated and translated address space identifiers (ASIDs). In one embodiment, a processing device comprising a translation manager is provided. The translation manager receives a workload instruction from a guest application. The workload instruction comprises an untranslated (ASID) and a workload for an input/output (I/O) device. The untranslated ASID is translated to a translated ASID. The translated ASID inserted into a payload of the workload instruction. Thereupon, the payload is provided to a work queue of the I/O device to execute the workload based in part on at least one of: the translated ASID or the untranslated ASID.

20 Claims, 12 Drawing Sheets

(52) U.S. Cl.
CPC .............. *G06F 2009/45579* (2013.01); *G06F 2009/45583* (2013.01); *G06F 2212/151* (2013.01); *G06F 2212/651* (2013.01)

(58) Field of Classification Search
USPC ........................................................ 711/206
See application file for complete search history.

(56) References Cited

U.S. PATENT DOCUMENTS

| | | | |
|---|---|---|---|
| 7,490,216 B1* | 2/2009 | Chen ................... | G06F 12/1036 711/206 |
| 7,865,668 B2 | 1/2011 | Gregg et al. | |
| 2002/0156962 A1* | 10/2002 | Chopra ............... | G06F 9/30032 711/3 |
| 2005/0240936 A1* | 10/2005 | Jones .................... | G06F 9/3861 718/107 |
| 2009/0157961 A1* | 6/2009 | Gregg ................. | G06F 12/0893 711/118 |
| 2010/0115243 A1* | 5/2010 | Kissell .................. | G06F 9/3009 712/220 |
| 2011/0320759 A1* | 12/2011 | Craddock ........... | G06F 12/1081 711/206 |
| 2013/0055263 A1* | 2/2013 | King ....................... | H04L 51/00 718/1 |
| 2014/0123145 A1 | 5/2014 | Barrow-Williams et al. | |

OTHER PUBLICATIONS

International Search Report and Written Opinion of International Application No. PCT/CN2018/080862 dated Dec. 27, 2018, 9 pages.

* cited by examiner

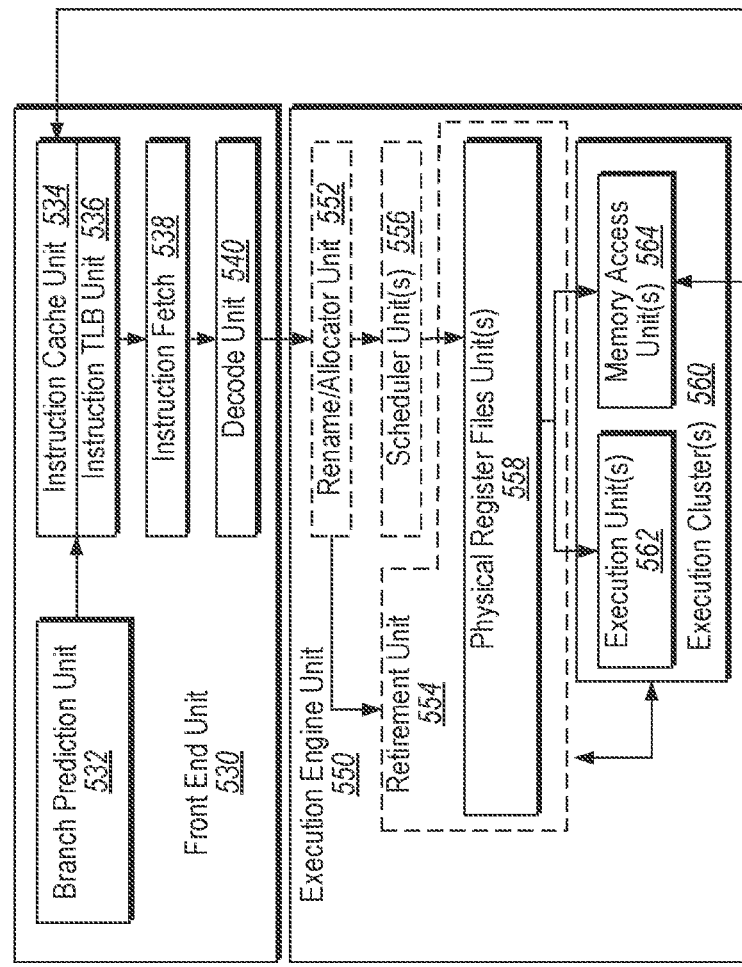
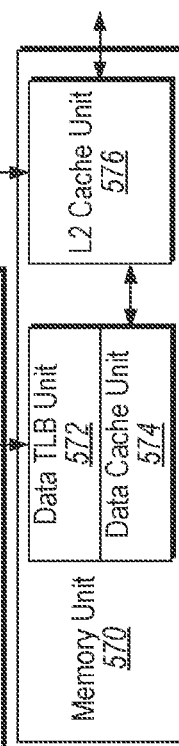
FIG. 5A
FIG. 5B

ADDRESS SPACE IDENTIFIER MANAGEMENT IN COMPLEX INPUT/OUTPUT VIRTUALIZATION ENVIRONMENTS

TECHNICAL FIELD

Embodiments of the disclosure relate generally to virtualization within microprocessors, and more specifically, but without limitation, to address space identifier management in complex input/output virtualization environments.

BACKGROUND

Virtualization allows multiple instances of an operating system (OS) to run on a single system platform. Virtualization is implemented by using software, such as a virtual machine monitor (VMM) or hypervisor, to present to each OS a "guest" or virtual machine (VM). The VM is a portion of software that, when executed on appropriate hardware, creates an environment allowing for the abstraction of an actual physical computer system also referred to as a "host" or "host machine." On the host machine, the virtual machine monitor provides a variety of functions for the VMs, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor according to one embodiment.

FIG. 5B is a block diagram illustrating an in-order pipeline and a register renaming stage, out-of-order issue/execution pipeline according to one embodiment.

DETAILED DESCRIPTION

Figure 1:
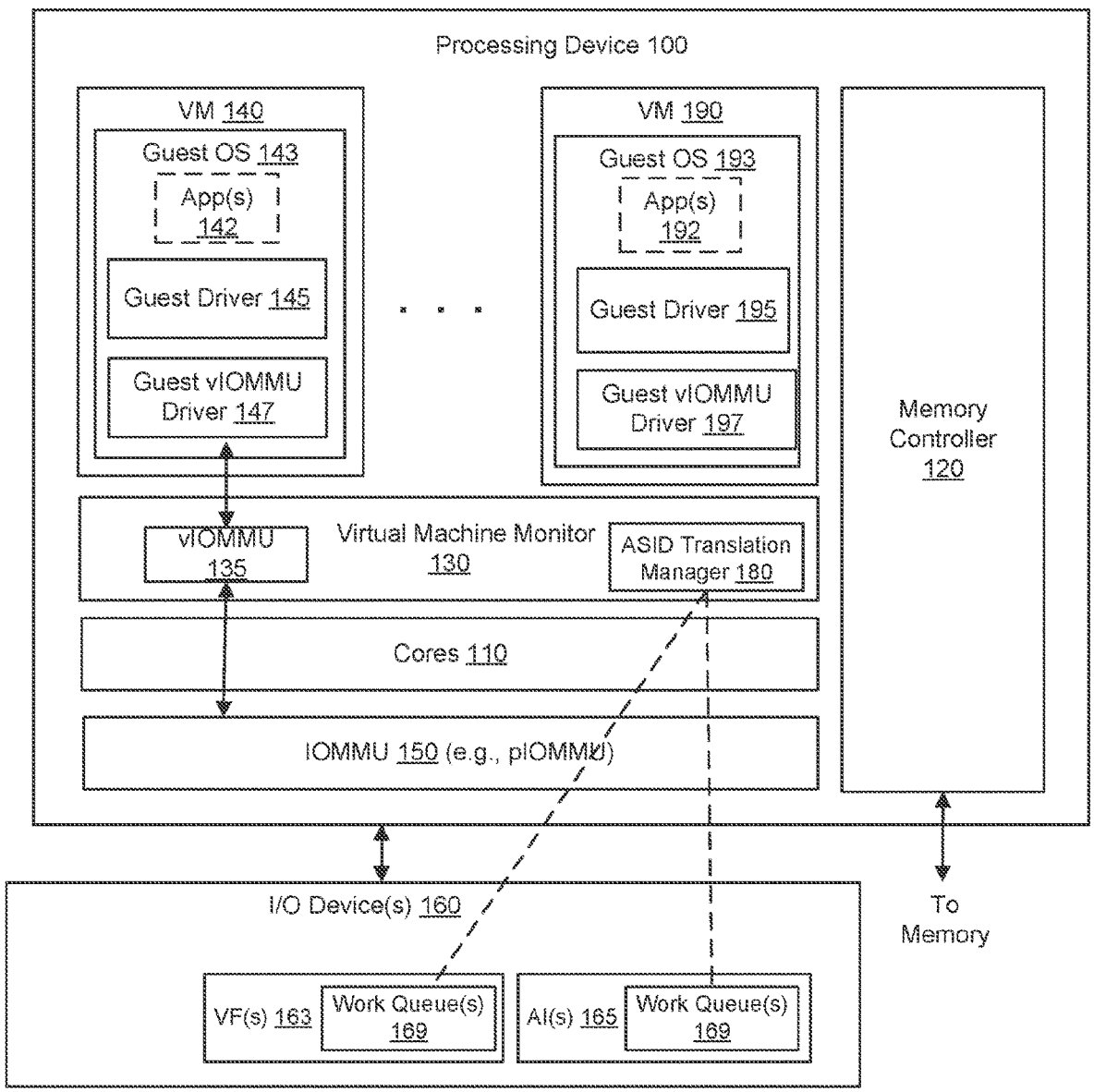
FIG. 1 illustrates a block diagram of a processing device to support address space identifier management in complex input/output virtualization environments according to one embodiment.

Shared virtual memory (SVM) allows for fast accelerator input/output (I/O) devices (e.g., graphics and field programmable gate array (FPGA)) to be directly controlled by user space processes. In implementations, a process address space identifier (PASID or simply "ASID") is used in SVM-capable Peripheral Component Interconnect Express (PCI-e®) devices. For example, an I/O memory management unit (IOMMU) may further use the ASID information, which is embedded in a direct memory access (DMA) request out of the SVM-capable device, to assist address translation before forwarding the DMA request to memory controller. The IOMMU could support multiple translation tables (thus multiple address spaces) on a SVM-capable PCIE device. The translation tables are indexed by an ASID received in a direct memory access (DMA) request.

System software (e.g., Operation System or hypervisor) may share process CPU page tables with the IOMMU (each associated with an ASID) so that a virtual address (VA) can be used directly in the workload requests submitted to the device. Consequently the device tags associated ASID to every DMA request which is generated when processing submitted workload request. Upon receiving certain information (e.g., BDF (bus number, device number and function number), ASID, VA) in DMA request, the IOMMU uses the BDF to locate device specific context entry, then ASID for the ASID entry on that device, and then walks through shared CPU page table (pointed by ASID entry) to get physical address (PA). Finally, the VA received is DMA request is translated to PA by IOMMU and then forwarded to a memory controller. With the introduction of SVM, applications may directly submit workloads to the device using CPU virtual address, which bypasses unnecessary overhead in kernel device driver and thus can greatly improve the performance.

To submit workloads to the SVM-capable devices, two types of submission modes are supported in SVM implementations, e.g., a dedicated work queue (DWQ) and a shared work queue (SWQ). A DWQ is dedicated for the use by one software entity, such as application process (either on bare metal, or within a VM). Each DWQ is associated with an ASID field, which is usually programmed (e.g. in a memory-mapped I/O (MMIO) register) by a device driver before the software entity starts workload submissions. Upon workload submitted on DWQ, the device reads the ASID from a corresponding register and then puts it in an outgoing DMA request. A SWQ can be used by more than one software entity simultaneously. For example, when multiple applications may submit work to SWQ using certain CPU instructions, the ASID and workload request are directly included in the instruction payload. Upon workload submitted on SWQ, the device reads the ASID directly from the instruction payload handle in the requested workload, and then puts the ASID in any outgoing DMA request belonging to the workload being processed.

In virtualized environments, SVM can also be supported when a SVM-capable device is assigned to a VM. For example, the device could be either a PCI endpoint device (Physical Function—PF), or a Virtual Function (VF), if it self-virtualizes into multiple VFs following PCISIG Single Root I/O Virtualization (SR-IOV). In this type of environment, the IOMMU implements a nested table configuration, where two-level translations are enabled to first translate guest virtual address (GVA) to guest physical address (GPA), and then from GPA to a host physical address (HPA). In some implementations, the ASID is used to support translation of GVA into HPA of the host machine for the SVM scalable devices. For example, the ASID sent with the DMA request from the I/O device may be used as an index into an ASID table to identify the $1^{st}$ level translation structure (GVA->GPA). In some implementations, the ASID table pointer in context entry is treated as a GPA, which also needs to go through the 2nd level translation to HPA. In such a case, the ASID table (and associated ASID address space) can be directly provisioned by the VM, since it is part of the assigned device resources. In some implementations, the hypervisor emulates a virtual IOMMU to the VM, so guest ASID table can be retrieved and then programmed to the physical IOMMU. Once guest ASID table is hooked to the IOMMU, guest software can start workload submissions (either DWQ or SWQ) that include the guest ASID and follow device specifications without hypervisor intervention.

In Scalable IOV (input/output virtualization), the I/O device implements a hosting function (similar to the PF) and many assignable interfaces (AIs). In this type of implementation, the ASID is extended to support boarder usages, by the IOMMU, to translate a guest physical address (GPA), guest I/O virtual address (GIOVA), or guest virtual address (GVA) into a host physical address (HPA) of the host machine. A key concept is the implementation of an assignable interface (AI), which a much more light-weight version of VF that can be directly assigned to a VM. Each AI contains one or multiple 4 KB pages of MMIO registers for fast data-path submission (e.g., frequent data path accesses that are performance critical) that can be accessed directly from the VM, but typically most slow control-path resources are absent (e.g. PCI configuration space, VF MMIO BAR, PCI MSI-X table, etc) The system software (e.g., hypervisor) composites the AIs into a virtual device (VDEV) and configures the VM access policy on VDEV resources. From VM point of view, the VDEV behaves like a normal PCI endpoint device. In some implementations, fast data-path accesses from the VM are passed through to AIs, while slow control-path accesses (e.g., infrequent accesses not performance critical) are fully trap-and-emulated by the system software. By moving composition complexity from device to system software, Scalable IOV reduces the hardware complexity while providing better scalability and composability than PCI SR-IOV.

As all AIs shares the same BDF of the hosting function, Scalable IOV leverages the ASID to identify AIs from each other, regardless of whether the AI is doing non-SVM or SVM translation. The implication is that the ASID is managed now by system software, which leads to the concept of translation between two ASID spaces, such as from a guest ASID space to host ASID space, because guest PASID cannot be directly used by IOMMU in such situation. For DWQ submissions, the interface of programming the ASID falls into the concept of slow-control path operations and thus is trap-and-emulated by system software. The system software translates a captured guest ASID to a host ASID which is then programmed to the I/O device. For SWQ submissions, a VMCS ASID translation structure is used. The VMCS (VM control structure) is stored in a region of memory and contains, for example, state of the guest, state of the VMM, and control information indicating under which conditions the VMM wishes to regain control during guest execution. The VMCS ASID translation structure is used to translate the guest ASID to a host ASID before the workload submission instruction goes out to the bus. This is so the device will always receive the host ASID consistently. In such a configuration, a host ASID table in the IOMMU is managed by system software and the ASID field on the PCI wire is always the host ASID.

There are, however, several issues that can occur when there is mixed DWQ/SWQ usage on multiple I/O devices which are assigned to the same VM. For example, if Scalable IOV is enabled, the SVM capable I/O device includes one or more assignable interfaces (AIs) for the hosting function supported by the device, and host ASID is always expected as aforementioned. If the device supports SR-IOV, then the device may also include one or more virtual functions (VFs) for each physical function (PF). In such cases, for a DWQ path on an assigned PF/VF, the guest ASID is observed on the PCI bus due to the guest programming of the ASID (thru MMIO registers) is passed through to the device without VMM intervention. In another instance, for a SWQ path on the same assigned PF/VF, host ASID is observed on the PCI bus because the VMCS ASID translation takes effects for all workload submission instructions, regardless of whether the instruction targets PF/VF or AI. Due to the mixed DWQ/SWQ usage on the PCI bus, an ASID conflict can occur on the assigned PF/VF as one device can be linked to only one ASID table (thus one ASID name space) in the IOMMU. As such, there is no way to differentiate in the IOMMU whether the received ASID should be treated as a guest ASID or a host ASID for given PF/VF. This confusion may cause a fatal system runtime error or other types of abnormal and unexpected system behavior.

Embodiments of the disclosure address the above-mentioned and other deficiencies by providing techniques to extend the workload instruction to include both untranslated ASID (e.g., guest ASID) and translated ASID (e.g., host ASID) together with a workload message in the workload instruction payload. For example, the guest AISD in the workload instruction may be translated to a host ASID in the same message in order for it to be used by the endpoint device (e.g., I/O device). In accordance with embodiments of the disclosure, the I/O device may be configured to determine which ASID on the workload instruction to use based on whether Scalable-IOV is enabled on that device. If Scalable-IOV is enabled and the translated ASID is available on the workload instruction, then the I/O device uses the translated ASID (indicating a workload instruction issued in VM and VMCS PASID translation structure is enabled). Otherwise, the I/O device uses the untranslated ASID (indicating an workload instruction issued on bare metal, e.g., in a container where VMCS PASID translation structure is disabled). If Scalable-IOV is disabled, then the I/O device (being a PF or VF) always uses the untranslated ASID on the workload instruction for all DMA transactions. In this way, the device always sends out DMA request with consistent ASID namespace (either guest ASIDs on assigned PFs/VFs or host ASIDs on assigned AIs) to IOMMU on the PCI BUS. As such, there is no potential guest ASID/host ASID conflicts on any device in IOMMU side. Thus, the IOMMU's current design can be sustained (one device links to only one ASID table meaning one ASID namespace).

In some embodiments, the systems and methods described herein may use Peripheral Component Interconnect (PCI) ASIDs associated with certain I/O devices. It is envisioned that the disclosure can be used with other types of address space ID implemented by various I/O devices. In addition, although the disclosure refers to a VM and VMM, the systems and methods discussed herein apply equally to containers and other types of host software virtualization systems.

FIG. 1 illustrates a block diagram of a processing device 100 for supporting address space identifier management in complex input/output virtualization environments according to one embodiment. The processing device 100 may be generally referred to as "processor" or "CPU". "Processor" or "CPU" herein shall refer to a device that is capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory (not shown). The memory for one such system is a DRAM memory. The DRAM memory can be located on the same chip as the processor and other system components. Additionally, other logic blocks such as a memory controller or graphics controller can also be located on the chip.

In an illustrative example, processing core 110 may have a micro-architecture including processor logic and circuits. Processor cores with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file). The processor core(s) 110 may execute instructions for the processing device 100. The instructions may include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100.

The processing device 100 may be used with a computing system on a single integrated circuit (IC) chip of the computing system. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In various implementations, the processing device 100 may further include a virtual machine monitor (VMM) 130 (or hypervisor), one or more virtual machines (VM), identified as VM 140 through VM 190 in FIG. 1, and a hardware IOMMU 150, which is also known as a physical or pIOMMU. The VM 140 may execute a guest OS 143 within which may be run a number of applications 142, one or more guest device drivers 145 and a guest vIOMMU driver 147. The VM 190 may execute a guest OS 193 on which may be run a number of applications 192, one or more guest device drivers 195 and a guest vIOMMU driver 197. The processing device 100 may include one or more additional virtual machines. Each guest vIOMMU driver 147 or 197 may interact with a virtual IOMMU (vIOMMU) 135 of the VMM 130 and the hardware IOMMU 150.

With further reference to FIG. 1, the VMM 130 may abstract a physical layer of a hardware platform of a host machine that may include the processing device 100, and present this abstraction to the guests or virtual machines (VMs) 140 or 190. The VMM 130 may provide a virtual operating platform for the VMs 140 through 190 and manages the execution of the VMs 140 through 190. In some implementations, more than one VMM may be provided to support the VMs 140 through 190 of the processing device 100. Each VM 140 or 190 may be a software implementation of a machine that executes programs as though it was an actual physical machine. The programs may include the guest OS 143 or 193, and other types of software and/or applications, e.g., applications 142 and 192, respectively running on the guest OS 143 and guest OS 193.

In some implementations, the hardware IOMMU 150 may enable the VMs 140 and 190 to use the I/O devices 160, such as Ethernet hardware, accelerated graphics cards, and hard-drive controllers, which may be coupled to the processing device 100, e.g., by way of a printed circuit board (PCB) or an interconnect that is placed on or located off of the PCB. The guest application 140 or guest device driver 145, in implementations, submits a workload to the I/O device 160 (the workload descriptor includes some virtual addresses of the processing device 100. The I/O device 160 processes the workload which includes sending DMA requests to access the specified virtual addresses. For each DMA request out of the I/O device 160, the IOMMU 150 translates from virtual address to corresponding physical address (same as the translation done on CPU side when an instruction tries to access a virtual address. Then, the translated DMA request (containing physical address) is forwarded by the IOMMU 150 to the memory controller 120.

VMM 130, in implementations, virtualizes the IOMMU to expose a "virtual IOMMU" 135 to the VM 190. Then based on captured operations on the virtual IOMMU 135, the VMM 130 configures the physical IOMMU 150 to support the guest-initiated SVM operations on guest vIOMMU drivers 147, 197 which are assigned to a guest. In some implementations, the hypervisor emulates a virtual IOMMU 135, so that a guest ASID table (not shown) can be retrieved and then programmed to the physical IOMMU 150. Once guest ASID table is hooked to the IOMMU 150, guest software using the guest vIOMMU driver 147 can start workload submissions (either DWQ or SWQ) that include the guest ASID and follow device specifications without VMM 130 intervention. The processing device 100 may also include a host ASID table (not shown) managed by the VMM 130. For example, the VMM allocates a host ASID and programs it in a host ASID table of the physical IOMMU's for nested translation using pointers to a first level (GVA->GPA) translation table and second level (GPA->HPA) translation table. Here the host ASID table may be indexed by using the guest ASID received from a VM, or using a distinct host ASID (i.e. different from guest ASID). The former has the same effect as directly linking guest ASID table, i.e. guest ASID from device is expected, which are both called "guest ASID table" in this writing. The later requires translation from guest ASID to host ASID, which is called "host ASID table". In this regard, the guest ASID table is used for PF/VF 163 and the host ASID table is for AIs 165 of the I/O device 160.

The I/O devices 160 may be configured to issue memory requests, such as memory read and write requests, to access memory locations in the memory and in some cases, translation requests. The memory requests may be part of a DMA read or write operation, for example. The DMA operations may be initiated by software executed by the processing device 100 directly or indirectly to perform the DMA operations. Depending on the address space in which the software executing on the processing device 100 is running, the I/O devices 160 may be provided with addresses corresponding to that address space to access the memory. For example, a guest application (e.g., application 142) executing on processing device 100 may provide an I/O device 160 with guest virtual addresses (GVAs). When the I/O device 160 requests a memory access, the guest virtual addresses may be translated by the hardware IOMMU 150 to corresponding host physical addresses (HPA) to access the memory, and the host physical addresses may be provided to the memory controller 120 for access.

If Scalable IOV is enabled on one of the I/O devices 160, the device includes one or more assignable interfaces (AIs) 165 for each hosting function (not show) supported by the device. If a different one of the devices 160 supports SR-IOV, then the device includes one or more virtual functions (VFs) 163. Each of the AIs 165 and VFs 163 support one or more work submission interfaces. These interfaces enable a guest device driver, such as guest device drivers 145 and 195, of the VMs 140 and 190 to submit work directly to work queues 169 of the I/O devices 160 without host software intervention by the VMM 130. The type of work submission, but may include a dedicated work queue (DWQ) and/or shared work queue (SWQ) based work submissions. In some examples, the work queue 169 may be a ring, a linked list, an array or any other data structure used by the I/O devices 160 to queue work from software. The work queues 169 are logically composed of payload-descriptor storage (that convey the commands, operands for the work), and may be implemented with explicit or implicit doorbell registers (e.g., ring tail register) or portal registers to inform the I/O device 160 about new work submission.

The AIs 165 are a much more light-weight version of the VFs 163 that can be directly assigned to a VM. Each AI 165 contains one or multiple 4 KB pages of MMIO registers for fast data-path submission (e.g., frequent data path accesses that are performance critical) that can be accessed directly from the VM 140, 190, but typically most slow control-path resources are absent (e.g. PCI configuration space, VF MMIO BAR, PCI MSI-X table, etc) VMM 130 composites the AIs 142 into a guest driver 145 and configures the VM 143 access policy on driver resources. From VM point of view, the guest driver 145 behaves like a normal PCI endpoint device. In some implementations, fast data-path accesses from the VM 140 are passed through to AIs 165, while slow control-path accesses (e.g., infrequent accesses not performance critical) are fully trap-and-emulated by the system software.

As all AIs 165 shares the same BDF of the hosting function, Scalable IOV leverages the ASID to identify AIs from each other, regardless of whether the AI is doing non-SVM or SVM translation. The implication is that the ASID is managed now by VMM 130, which leads to the concept of translation between two ASID spaces, such as from a guest ASID space to host ASID space, because guest ASID cannot be directly used by IOMMU 150 in such situation. For DWQ submissions, the interface of programming the ASID falls into the concept of slow-control path operations and thus is trap-and-emulated by VMM 130. The VMM 130 translates a captured guest ASID to a host ASID which is then programmed to the I/O device 160. For SWQ submissions, a VMCS ASID translation structure is used. The VMCS (not shown) is stored in a region of memory and contains, for example, state of the guest, state of the VMM, and control information indicating under which conditions the VMM wishes to regain control during guest execution. The VMCS ASID translation structure is used to translate the guest ASID to a host ASID before the workload submission instruction goes out to the bus. This is so the device will always receive the host ASID consistently. In such a configuration, a host ASID table in the IOMMU is managed by VMM 130 and the ASID field on the PCI wire is always the host ASID.

In some implementations, if Scalable IOV is enabled, the SVM capable I/O device includes one or more assignable interfaces (AIs) for the hosting function supported by the device, and host ASID is always expected as aforementioned. If the device supports SR-IOV, then the device may also include one or more virtual functions (VFs) for each physical function (PF). In such cases, for a DWQ path on an assigned PF/VF 163, the guest ASID is observed on the PCI bus due to the guest programming of the ASID (thru MMIO registers) is passed through to the device without VMM 130 intervention. In another instance, for a SWQ path on the same assigned PF/VF 163, host ASID is observed on the PCI bus because the VMCS ASID translation takes effects for all workload instructions, regardless of whether the instruction targets PF/VF 163 or AI 165. Due to the mixed DWQ/SWQ usage on the PCI bus, an ASID conflict can occur on the assigned PF/VF 163 as one device can be linked to only one ASID table in the IOMMU 150. This conflict may cause a fatal system runtime error because the IOMMU is not able to differentiate whether the received ASID should be treated as a guest ASID or a host ASID for given PF/VF.

Embodiments of the disclosure extend the workload instructions to include both guest ASID (e.g., untranslated ASID) and host ASID (e.g., translated ASID) in the work submitted by the VMs to the I/O devices 160 to be executed. For example, the guest AISD in the workload instruction may be translated to a host ASID, which is then included in the same instruction with the guest ASID. This allows for the guest ASID and host ASID to be used by the endpoint device for the work load. To insert the guest-to-host ASID translation into the workload instruction associated with work sent to the work queues 169 (e.g., SWQ), the processing device 100 implements an ASID translation manager 180 also referred to herein as a translation manager circuit. For example, the ASID translation manager 180 may be implemented as part of the VMM 130. In alternative implementations, the ASID translation manager 180 may be implemented in a separate hardware component, circuitry, dedicated logic, programmable logic, and microcode of the processing device 100 or any combination thereof. In one implementation, the ASID translation manager 180 may include a micro-architecture including processor logic and circuits similar to the processing cores 110. In some implementations, the ASID translation manager 180 may include a dedicated portion of the same processor logic and circuits used by the processing cores 110.

Figure 2:
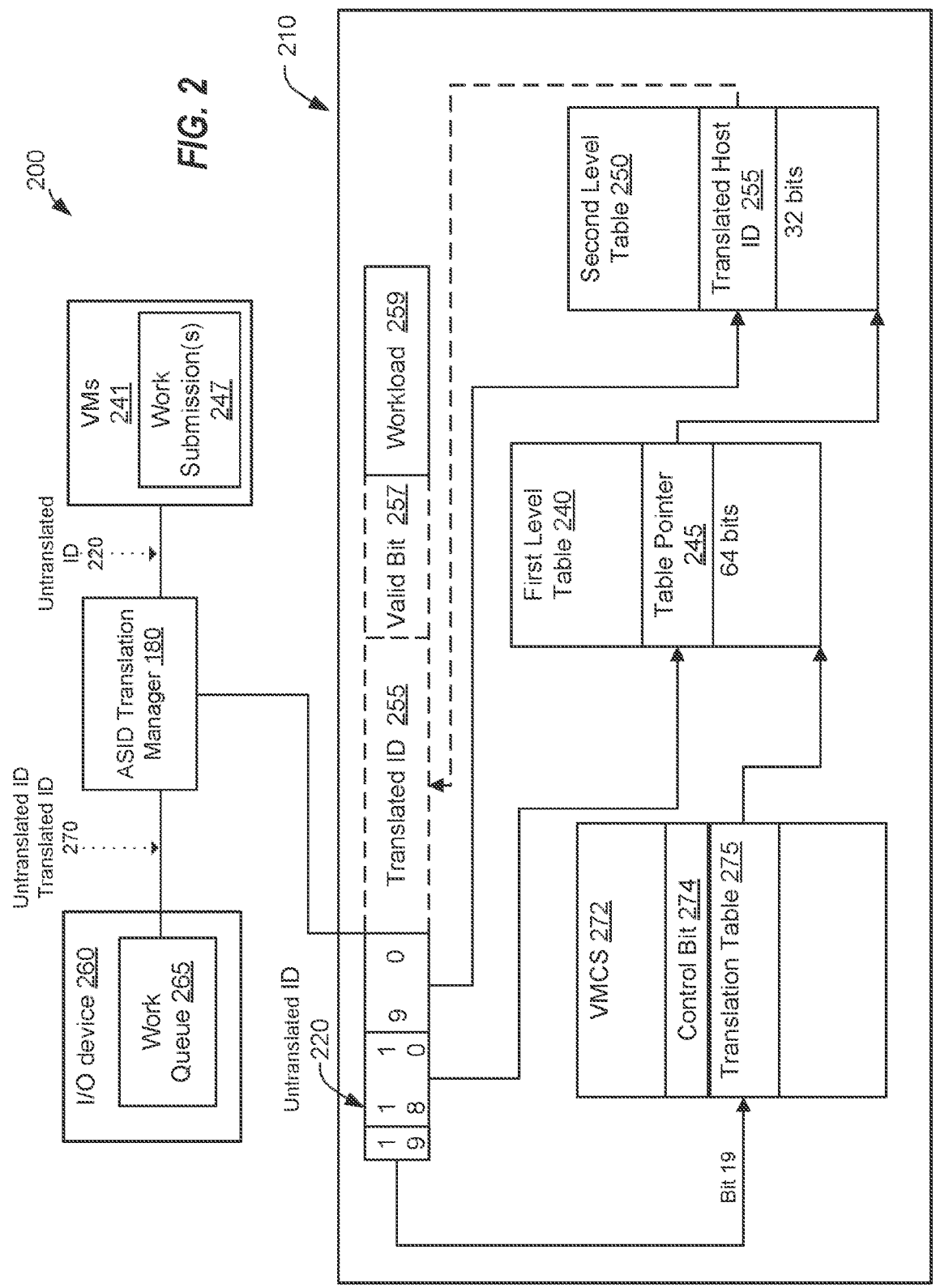
FIG. 2 illustrates a block diagram of an apparatus including a memory for address space identifier management in complex input/output virtualization environments according to one embodiment.

FIG. 2 illustrates a block diagram of an apparatus 200 including a memory 210 for address space identifier management in complex input/output virtualization environments according to one embodiment. The apparatus 200 may be compared to the processing device 100 of FIG. 1. For example, the apparatus 200 includes the ASID translation manager 180 of FIG. 1, a plurality of VMs 241 (which may be compared to the VMs 140 and 190 of FIG. 1) and an I/O device 260 (which may be compared to the I/O devices 160 of FIG. 1). In this example, work submissions 247 to the I/O device 260 are implemented using a shared work queue (SWQ) 265. The SWQ 265 can be used by more than one software entity simultaneously, such as by the VMs 241. The I/O device 260 may support any number of SWQs 265. A SWQ may be shared among multiple VMs (e.g., guest drivers). The guest driver in the VMs 241 may further share the SWQ with other kernel mode and user mode clients within the VMs, which may use shared virtual memory (SVM) to submit work directly to the SWQ.

In some implementations, the VMs 241 transmits work submissions 247 to the work queue 265 using workload instructions. These instructions are "general purpose" in the sense that they can be used to queue work to SWQ(s) of any devices agnostic/transparent to the type of device to which the command is targeted. These instructions produce an atomic non-posted write transaction (a write transaction for which a completion response is returned back to the processing device). The non-posted write transaction is address routed like any normal MMIO write to the target device. The non-posted write transaction carries with it the ASID of the thread/process that is submitting this request. It also carries with it the privilege (ring-3 or ring-0) at which the instruction was executed on the host. It also carries a command payload that is specific to target device. These SWQs are typically implemented with work-queue storage on the I/O device but may also be implemented using off-device (host memory) storage.

Unlike DWQs, the SWQ 265 (due to its shared nature) does not have a pre-programmable ASID register. Instead, the ASID allocated to the software entity (e.g., VM 241) is included in the workload instruction as part of the work submission 247. The untranslated (guest) ASID 220 in the workload transaction may be translated to a translated (host) ASID 255 and inserted into a payload 270 of the workload instruction in order for it to be used by the endpoint device (e.g., I/O device 260). For example, the I/O device 260 may determine which ASID (e.g., untranslated ASID 220 or translated ASID 255) to use based on whether Scalable-IOV is enabled on the device.

To translate an untranslated ASID 220 to translated ASID 255, the apparatus 200 implements an ASID translation table 275 in the hardware-managed per-VM state structure also referred to as the VMCS 272. The VMCS 272 may be stored in a region of memory 210 and contains, for example, state of the guest, state of the VMM, and control information indicating under which conditions the VMM wishes to regain control during guest execution. The VMM can set up the ASID translation table 275 in the VMCS 272 to translate an untranslated ASID 202 to translated ASID 255 as part of the SWQ execution. The ASID translation table 275 may be implemented as a single level or multi-level table that is indexed by untranslated ASID 220 that is contained in the work instruction submitted to the work queue 265.

The untranslated ASID 220, in implementations, comprises a plurality of bits that are used for the translation of the untranslated ASID. The bits may include, for example, bits that are used to identify an entry in the first level ASID translation table 240, and bits that are used to identify an entry in the second level ASID translation table 250. The VMCS 272 may also contain a control bit 274, which controls the ASID translation. For example, if the ASID control bit is set to a value of 0, ASID translation is disabled and the untranslated ASID 220 is used. If the control bit is set to a value other than 0, ASID translation is enabled and the ASID translation table is used to translate the untranslated ASID 220 to a translated ASID 255. If the ASID translation is enabled, the ASID translation manager 180 also set a valid bit 257 to a value other than 0 to indicate that the translated ASID 255 in the workload instruction references a valid memory address, otherwise the valid bit 257 is set to 0 indicating that the untranslated ASID 220 is used. The ASID translation manager 180 of the VMM sets the control bit 274 to enable or disable the translation. In some implementations, the VMCS 272 may implement the control bit as an ASID translation VMX execution control bit, which may be enabled/disabled by the VMM.

When the control bit 272 is enabled, the ASID translation manager 180 attempts to translate the untranslated ASID 220 to a translated ASID 255 using the ASID translation table 275 and add it to in a workload instruction 270. In some implementations, the ASID translation manager 180 may use the bit 19 in the untranslated (Guest) ASID as an index into the VMCS 272 to identify the (two entry) ASID translation table 275. In one implementation, the ASID translation table 275 may include a pointer to base address of the first level ASID table 240. The first level ASID table 240 may be indexed by the untranslated ASID (bits 18:10) to identify an ASID table pointer 245 to a base address of the second level ASID table 250, which is indexed by the untranslated ASID (bits 9:0) to find the translated (host) ASID 255.

If the ASID translation manager 180 detects that a translation is found or otherwise identified, the valid bit 257 to is set to a value other than 0, and the translated ASID 255 is inserted into the payload 270 associated with the workload instruction 247 that also includes the untranslated ID 220 and the workload 259 for execution by the I/O device 260. If the ASID translation manager 180 detects that the translation is not found or identified, an alert is generated that causes a VMExit at VM 241. In some embodiments, the VMM creates a translation from the untranslated ASID to a translated ASID in the ASID translation table as part of VMExit handling. In alternative embodiments, the translation can be also created when emulating vIOMMU operations, which happens before issuance of the workload instruction.

After VMM handles the VMExit, the VM 241 is resumed and the instruction is retried. On subsequent executions of workload instructions by the SVM client, the ASID translation manager 180 may successfully find the host ASID 255 in the ASID translation table 275. The SWQ receives the work instruction 270 and uses either the guest host ASID 220 or the host ASID 255 to send address translation requests to the IOMMU (such as hardware IOMMU 150 of FIG. 1) to identify a physical page in the memory 210. When the VMExit occurs, the VMM checks the guest ASID in the virtual IOMMU's ASID table. If the guest ASID is configured in the virtual IOMMU, the VMM allocates a new host ASID and sets up the ASID translation table 275 in the VMCS 272 to map the guest ASID 220 to the host ASID 255. The VMM also sets up the host ASID 220 in the physical IOMMU for nested translation using the first level (GVA→GPA) and second level (GPA→HPA) translation (shown in FIG. 2 within the memory 210). If the guest ASID 220 is not configured in the virtual IOMMU, the VMM may treat it as an error and either injects a fault into the VM 241 or suspends the VM 241.

Figure 3:
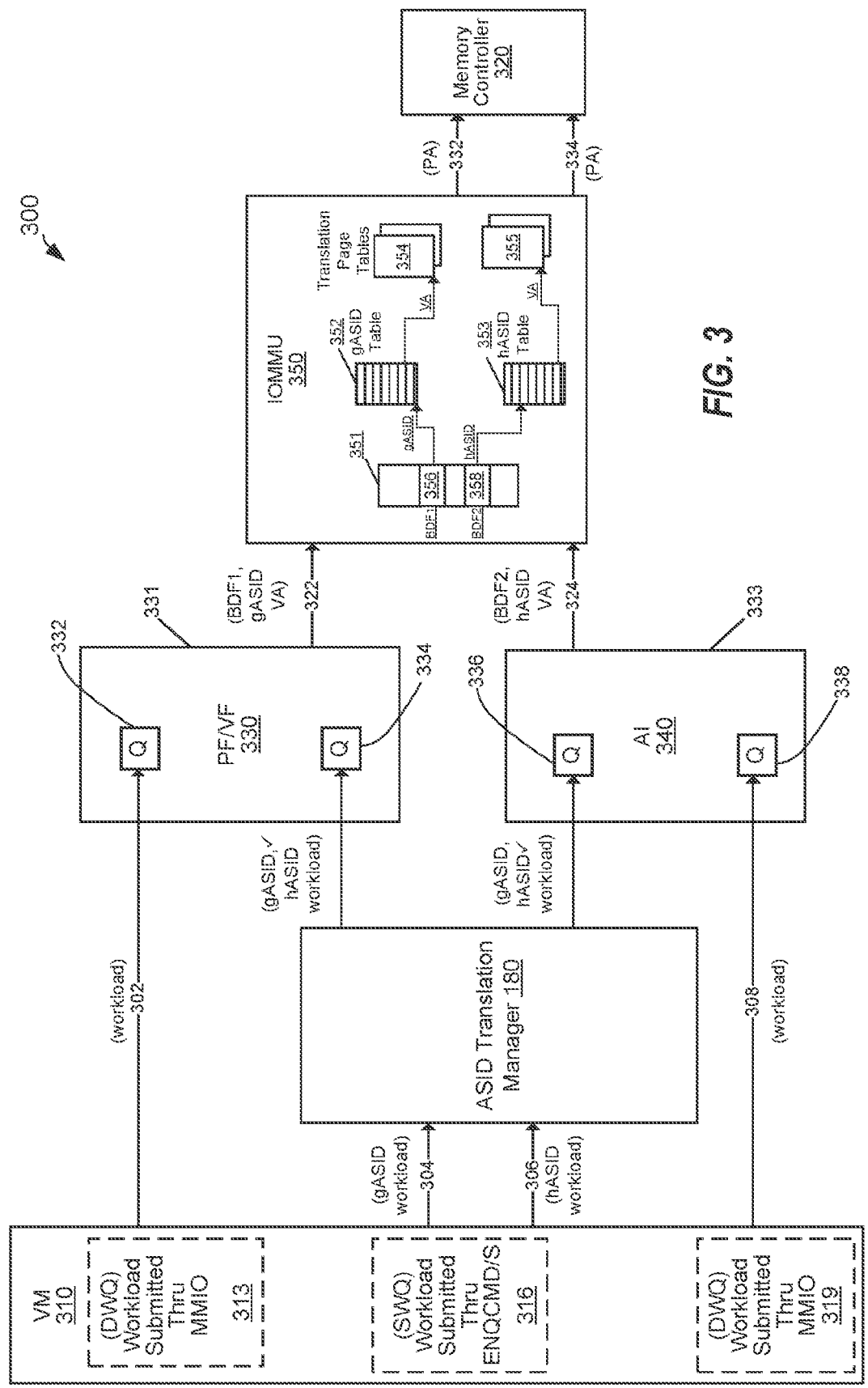
FIG. 3 illustrates a block diagram of a system to support address space identifier management in complex input/output virtualization environments according to one embodiment.

FIG. 3 illustrates a block diagram of a system 300 to support address space identifier management in complex input/output virtualization environments according to one embodiment. The system 300 may be compared to the processing device 100 of FIG. 1 and the apparatus of FIG. 2. For example, the system 300 includes the ASID translation manager 180 of FIG. 1, a VM 310 (which may be compared to the VMs 140 and 190 of FIG. 1 and the plurality of VMs 241 of FIG. 2), and IOMMU 350 (which may be compared to the IOMMU 150 of FIG. 1) and a memory controller 320 (which may be compared to the memory controller 120 of FIG. 1). In this example, a VMM (not shown) may assign a hosting function (SR-IOV VF or PF) 330 of SVM capable I/O devices 331, 333 to the VM 310. Some SVM capable I/O devices, such as device 331, implement SR-IOV VF/PF 330, while other SVM capable I/O devices, such as device 333, implement an assignable interface (AI) 340 for the hosting function supported by the device. The VM 310 may submit work directly to work queues (e.g., Q 332, 334, 336, 338) associated with the PF/VFs 330 and AIs 340 without intervention of the VMM. The "work queue" can be, for example, a ring, a linked list, an array or any other data structure used by the I/O devices to queue work from software. The exact method for work submission is device-specific, but the work queues (e.g., Q 332, 334, 336, 338) may be broadly classified into a dedicated work queue (DWQ) and shared work queue (SWQ) based work submissions.

Work submissions from the VM 310, in embodiments, may be submitted to one or more dedicated work queues, such as DWQ 313, 319 or a shared work queue (SWQ) 316. For example, software logic 313, 319 utilizing a DWQ interface to submit work submissions (e.g., to Q 332, 338) may be associated with an MMIO register (not shown). The MMIO register can be programmed by the VM 310 with a guest ASID that is used to process work from the DWQ. The software logic 316 for SWQ work submissions can be used by more than one software entity simultaneously, such as by the VMs 310. The I/O device may support any number of SWQs. A SWQ (such as Q 334 and Q336) may be shared among multiple VMs (e.g., guest drivers). The guest driver in the VMs 310 may further share the SWQ 316 with other kernel mode and user mode clients within the VMs, which may use shared virtual memory (SVM) to submit work directly to the SWQ 316.

VM 310 transmits SWQ work submissions using certain workload instructions. These instructions are "general purpose" in the sense that they can be used to queue work to SWQ(s) of any devices agnostic/transparent to the type of device to which the command is targeted. These instructions produce an atomic non-posted write transaction (a write transaction for which a completion response is returned back to the processing device). The non-posted write transaction is address routed like any normal MMIO write to the target device. The non-posted write transaction carries with it the ASID of the thread/process that is submitting this request. It also carries with it the privilege (ring-3 or ring-0) at which the instruction was executed on the host. It also carries a command workload that is specific to target device.

System 300 extends the workload instruction to include both the untranslated (guest) ASID (e.g., gASID 304) and translated (host) ASID (e.g., hASID 306) in the work submitted by the VM 310. For example, the guest AISD 304 in the ENQCMD/S transaction may be translated to a host ASID 306 in order for it to be used by the endpoint device for the work load. To manage the guest-to-host ASID translation associated with the SWQ work submission 316, the system 300 implements the ASID translation manager 180 of FIG. 1. The ASID translation manager 180 attempts to translate the gASID 304 to a hASID 306 using several data structures as referenced in FIG. 2. If a translation is found, the host ASID 306 is inserted into the payload of the workload instruction with the gASID 304 and the workload for execution by the I/O device. If the translation is not found, it causes a VMExit at the VM 310.

The ASID translation manager 180 extends the workload instruction to enable the (SWQ) work queues Q 334, Q 336 to use either the gASID 304 or the host ASID 306 to send DMA requests to the IOMMU for translation. For example, system 300 may store a number of data structures that are accessible by the IOMMU 350. The data structures may include, for example, a context table 351, a guest ASID table 352, a host ASID table 353 and several nested translation tables 354, 355. The data structures are used to translate virtual addresses (VA) of VM 310 associated with the DMA request 222,224 to host physical addresses (PA) 332, 334 in memory (not shown). This memory may be assessable via memory controller 320. The IOMMU may index the context table 351 by using a BDF (bus number, device number and function number) of the PF/VF 330 and AI 304 associated with the DMA request 222,224. The IOMMU may index the context table 351 to identify a context entry pointing to either a guest ASID table 352 or a host ASID table 353. In this regard, the guest ASID table 352 does not mean the table structure is managed by the guest. Rather, it means a configuration which allows device to use the gASID 304. The guest ASID table 352 or a host ASID table 353 is then used by the IOMMU to perform a nested 2-level translation (using translation page tables 354, 355) of the guest VA to the host PA.

The I/O devices associated with the PF/VF 330 and AI 304 may be configured to determine which ASID (e.g., guest ID 304 or host ID 306) on the extended the ENQCMD/S to use based on whether Scalable-TOV is enabled on that device. If Scalable-IOV is enabled and the host ID 306 is available on the ENQCMD/S, then the I/O device uses the host ID 306, which corresponds to a physical page in the memory, which indicates that the workload is submitted from a VM context. Otherwise, the I/O device uses the guest ID 304 (also called untranslated ID) on the ENQCMD/S, which implies a bare metal access to AI where VMCS ASID translation is disabled (e.g. in container usage) If Scalable-IOV is disabled, then the I/O device always uses the guest ID 304 for all DMA transactions. In this way, the assigned PF/VF 330 uses the guest ASID 304 for a DMA request 222 to the IOMMU 350 and the assigned AI 340 uses the host ASID 306 in a DMA request 224 to the IOMMU 350, thus consistent ASID usage is guaranteed on each device.

Figure 4:
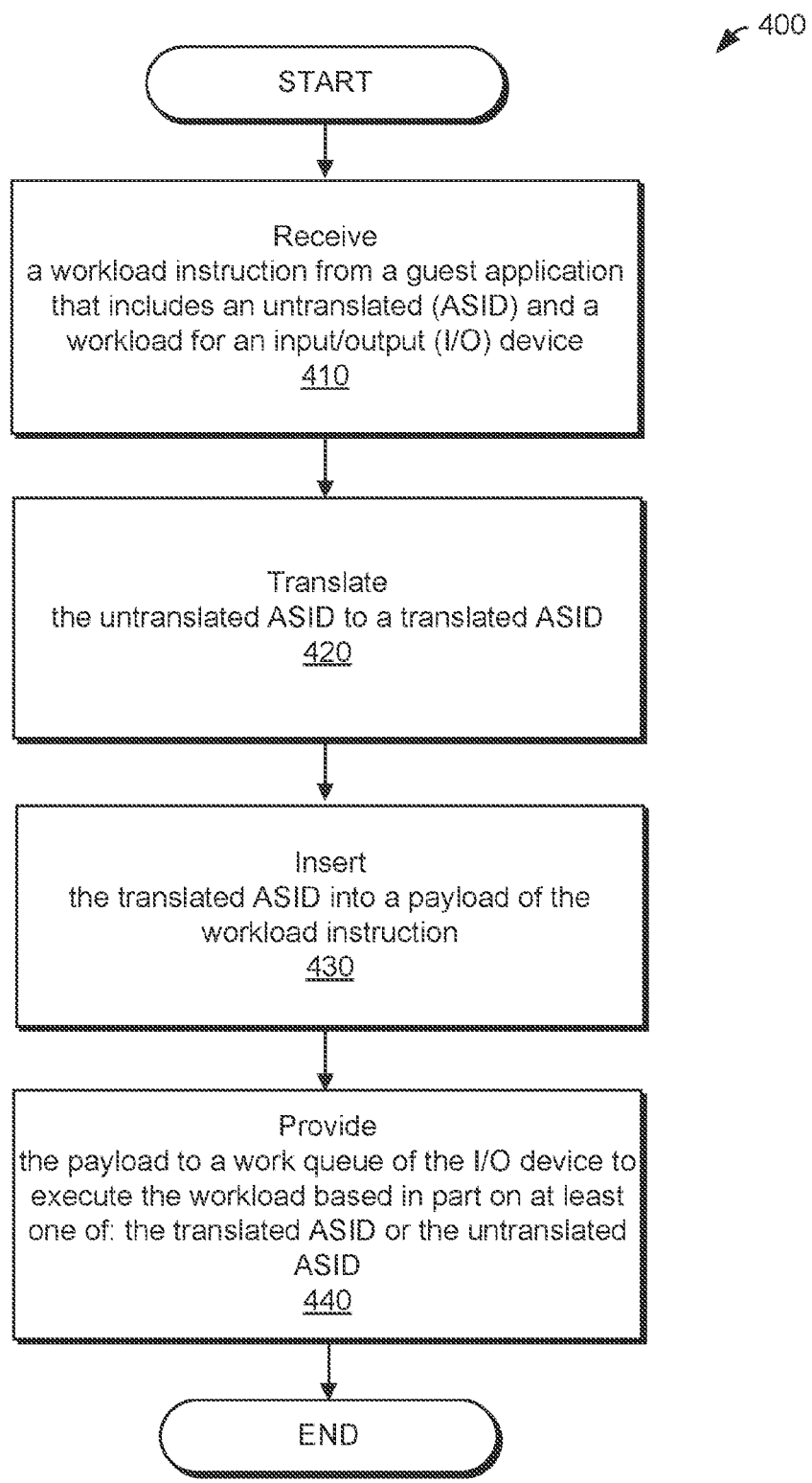
FIG. 4 illustrates a flow diagram of a method for space identifier management in complex input/output virtualization environments according to one embodiment.

FIG. 4 illustrates a flow diagram of a method 400 for space identifier management in complex input/output virtualization environments according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the ASID translation manager 180 of processing device 100 in FIG. 1 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a workload instruction 247 is received from a guest application 241. This workload instruction 247 comprises an untranslated address space identifier (ASID) 220 and a workload 259 for an input/output (I/O) device 260. The untranslated ASID 220 is translated to a translated ASID 255. The translated ASID 255 is inserted into a payload 270 of the workload instruction 247. Thereupon, payload 270 is provided to a work queue 265 of the I/O device 260 to execute the workload 259 based in part on at least one of: the translated ASID 255 or the untranslated ASID 220.

FIG. 5A is a block diagram illustrating a micro-architecture for a processor 500 that implements techniques for supporting address space identifier management in complex input/output virtualization environments functionality in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1 to implement techniques for supporting address space identifier management in complex input/output virtualization environments with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrate a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
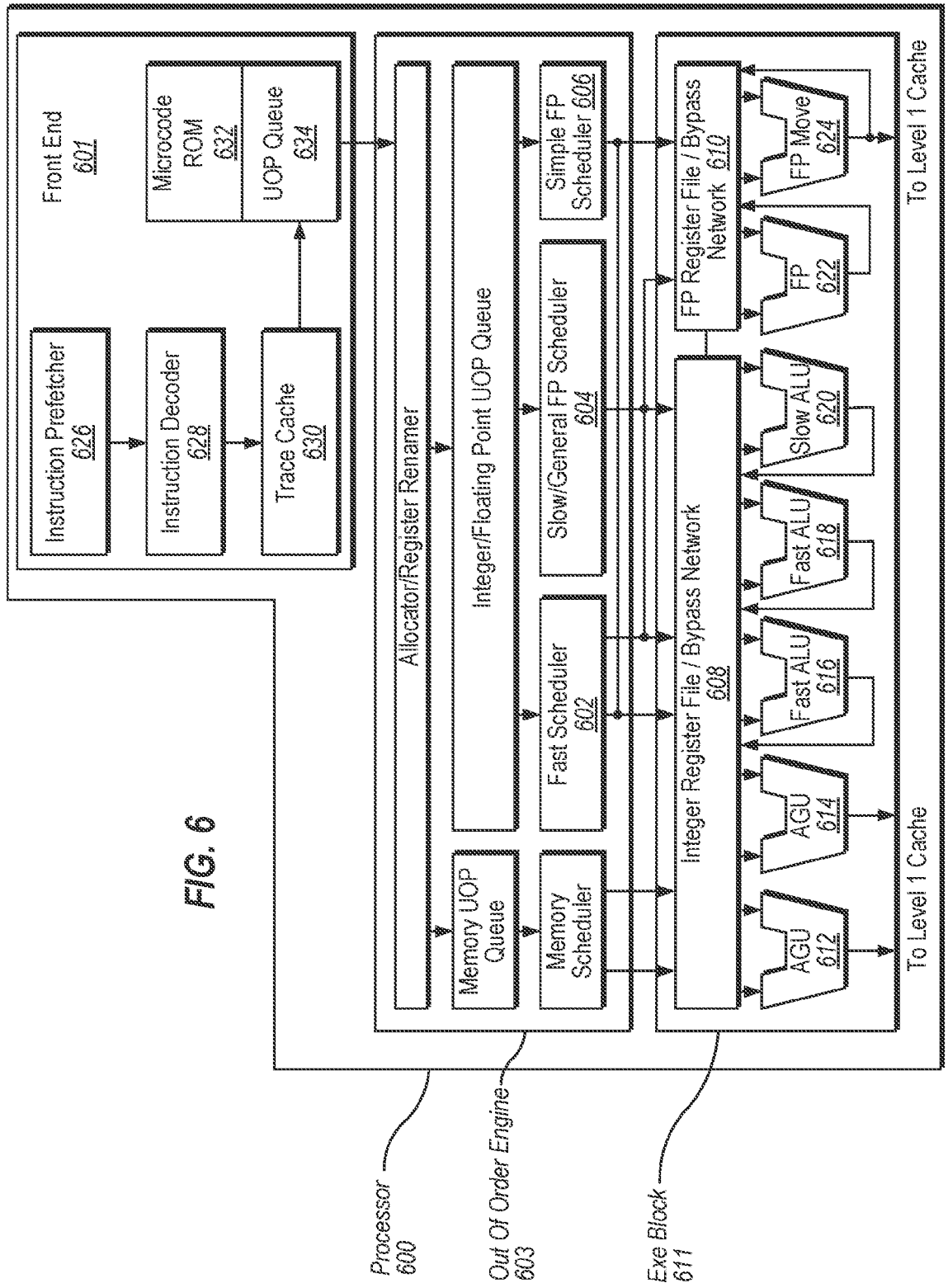
FIG. 6 is a block diagram illustrating a computer system according to one implementation.

FIG. 6 illustrates a block diagram of the micro-architecture for a processor 600 that includes logic circuits to implement techniques for supporting data compression using match-scoring functionality in accordance with one embodiment of the disclosure. In some embodiments, an instruction in accordance with one embodiment can be implemented to operate on data elements having sizes of byte, word, double word, quad word, etc., as well as data types, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct microinstruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution.

The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file 608, 610, for integer and floating-point operations, respectively. Each register file 608, 610, of one embodiment also includes a bypass network that can bypass or forward just completed results that have not yet been written into the register file to new dependent uops. The integer register file 608 and the floating-point register file 610 are also capable of communicating data with the other. For one embodiment, the integer register file 608 is split into two separate register files, one register file for the low order 32 bits of data and a second register file for the high order 32 bits of data. The floating-point register file 610 of one embodiment has 128 bit wide entries because floating-point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating-point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. The AGUs 612, 614, executes memory load/store operations. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating-point units 622, 624, can be implemented to support a range of operands having bits of various widths. For one embodiment, the floating-point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement address space identifier management in complex input/output virtualization environments according to embodiments of the disclosure. In one embodiment, the execution block 611 of processor 600 may include cache controller 140 for FIG. 1, for implementing techniques for supporting address space identifier management in complex input/output virtualization environments functionality. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also may contain an eight multimedia SIMD register for packed data.

For the discussions below, the registers are understood to be data registers designed to hold packed data, such as 64 bits wide MMX™ registers (also referred to as 'mm' registers in some instances) in microprocessors enabled with MMX™ technology from Intel Corporation of Santa Clara, Calif. These MMX™ registers, available in both integer and floating point forms, can operate with packed data elements that accompany SIMD and SSE instructions. Similarly, 128 bits wide XMM™ registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
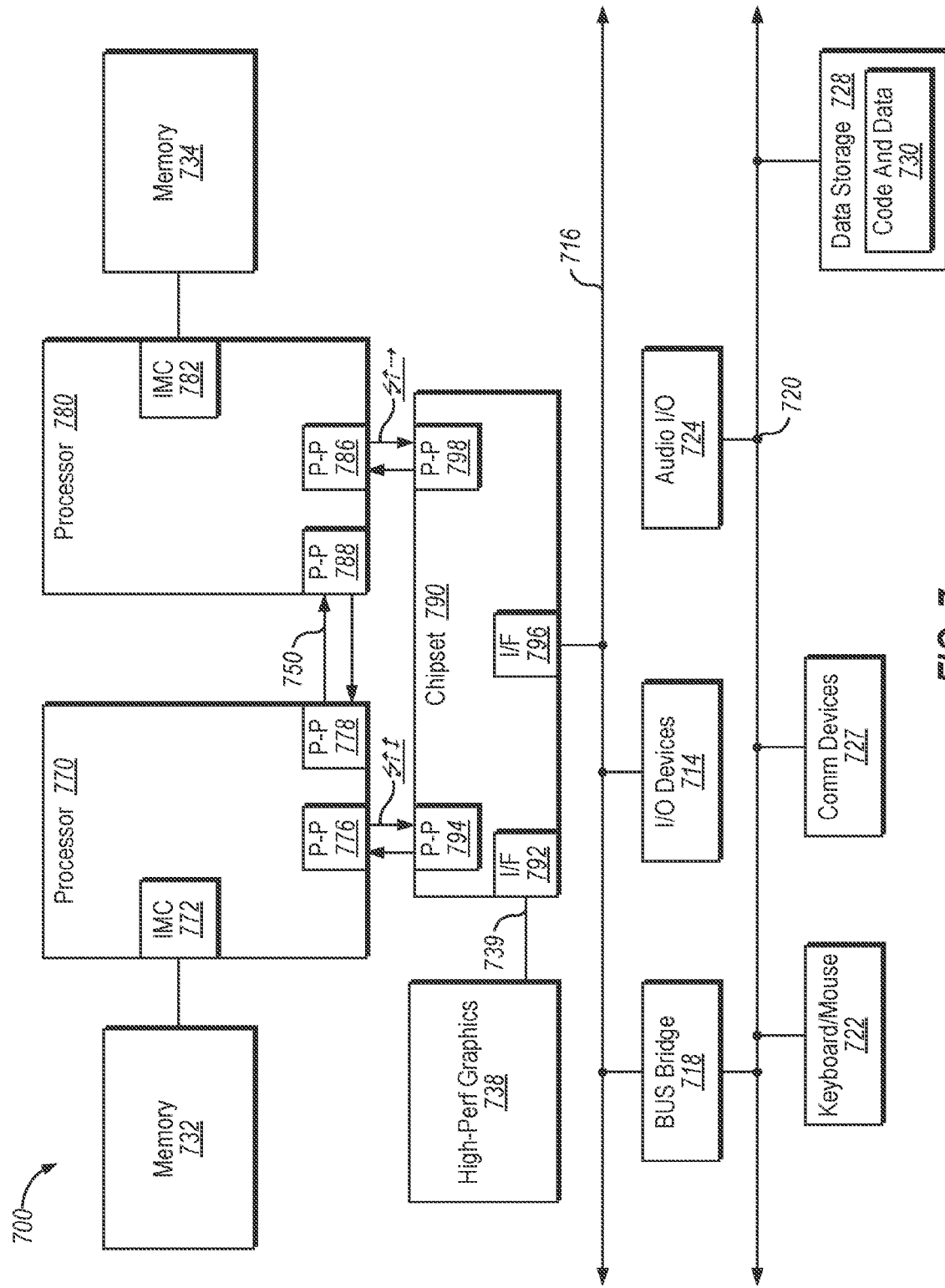
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multi-processor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting address space identifier management in complex input/output virtualization environments functionality as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
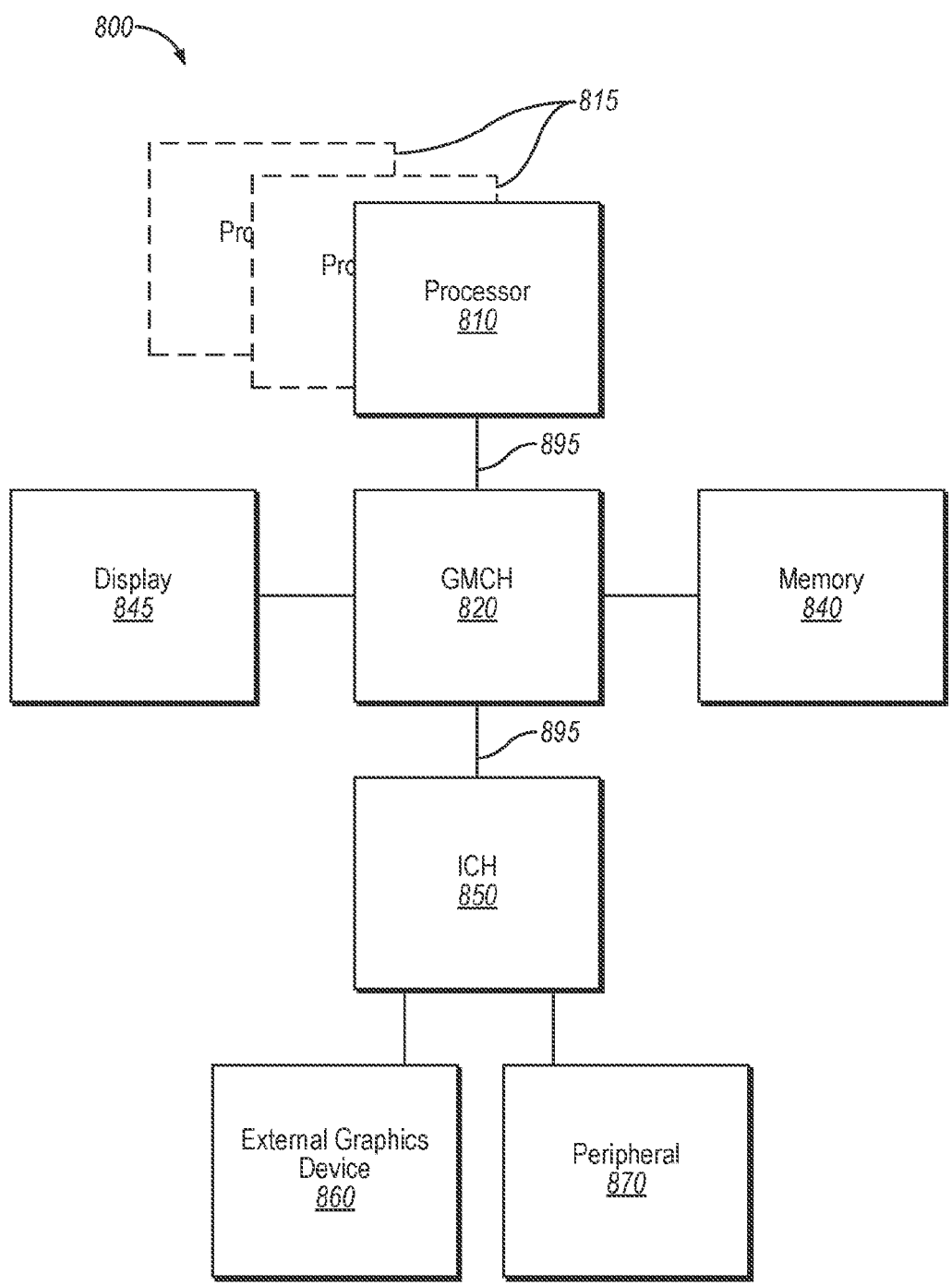
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting address space identifier management in complex input/output virtualization environments functionality according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
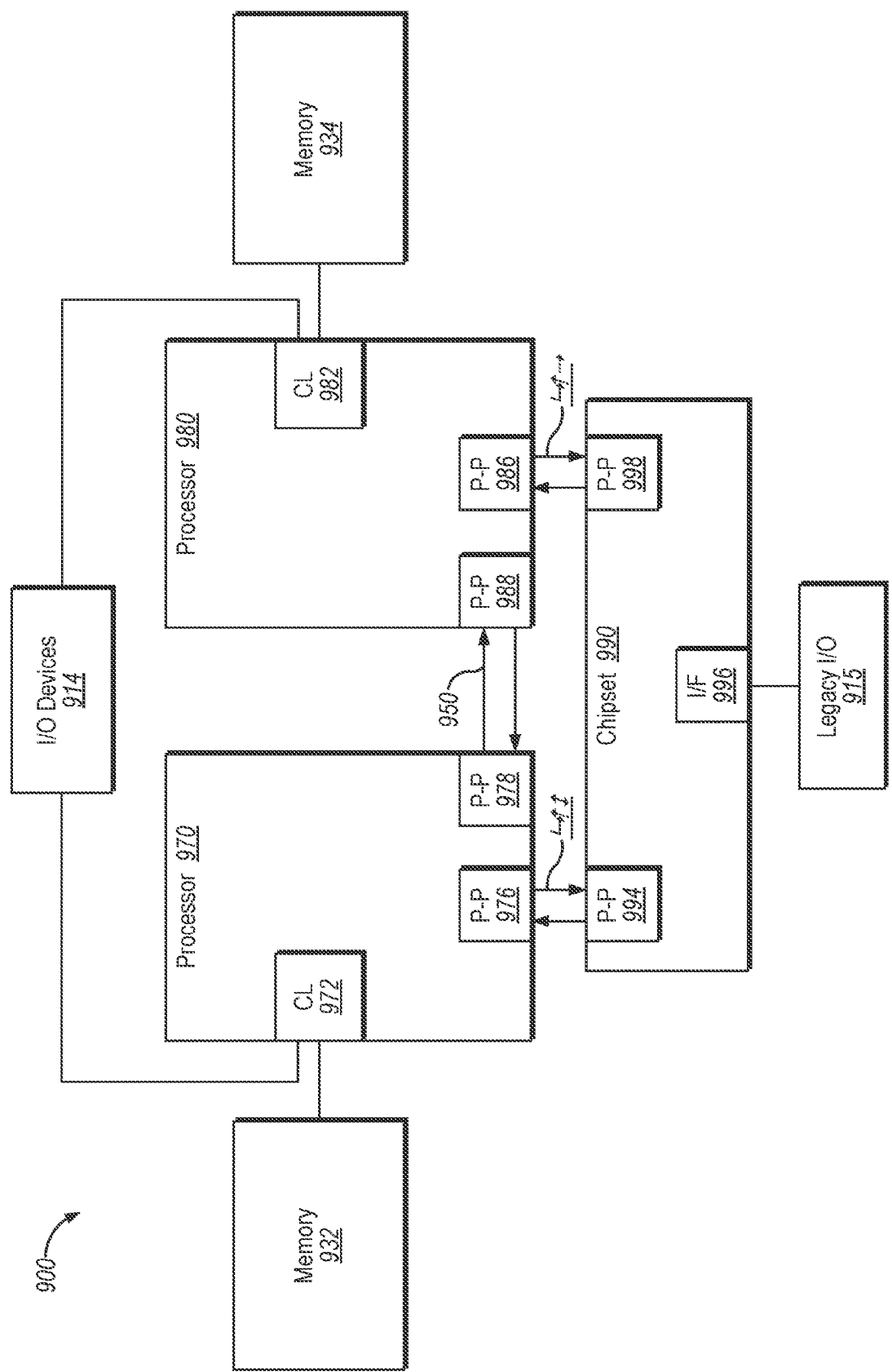
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may techniques for supporting address space identifier management in complex input/output virtualization environments functionality as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
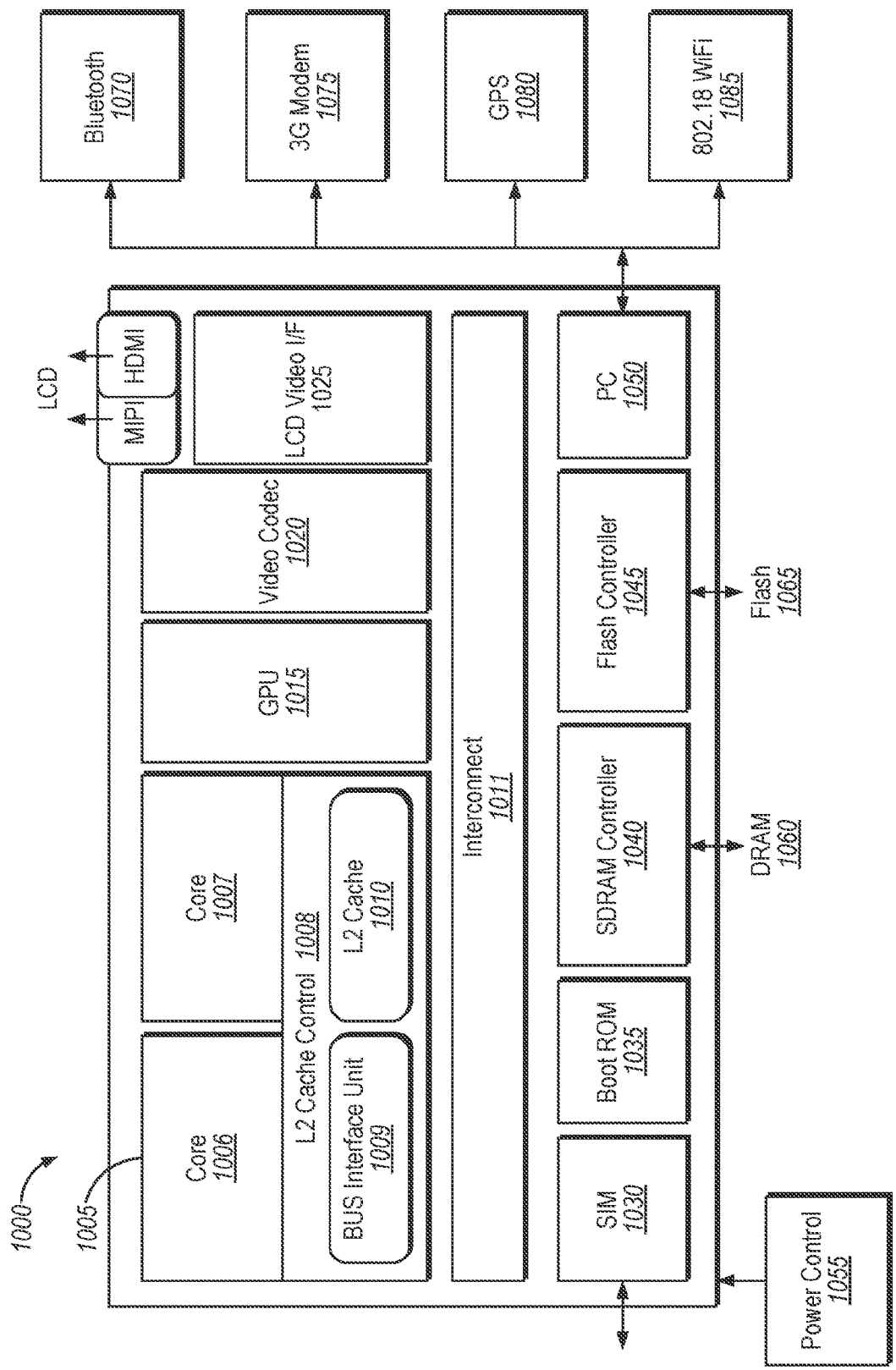
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing the ASID translation manager 180 as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogeneous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
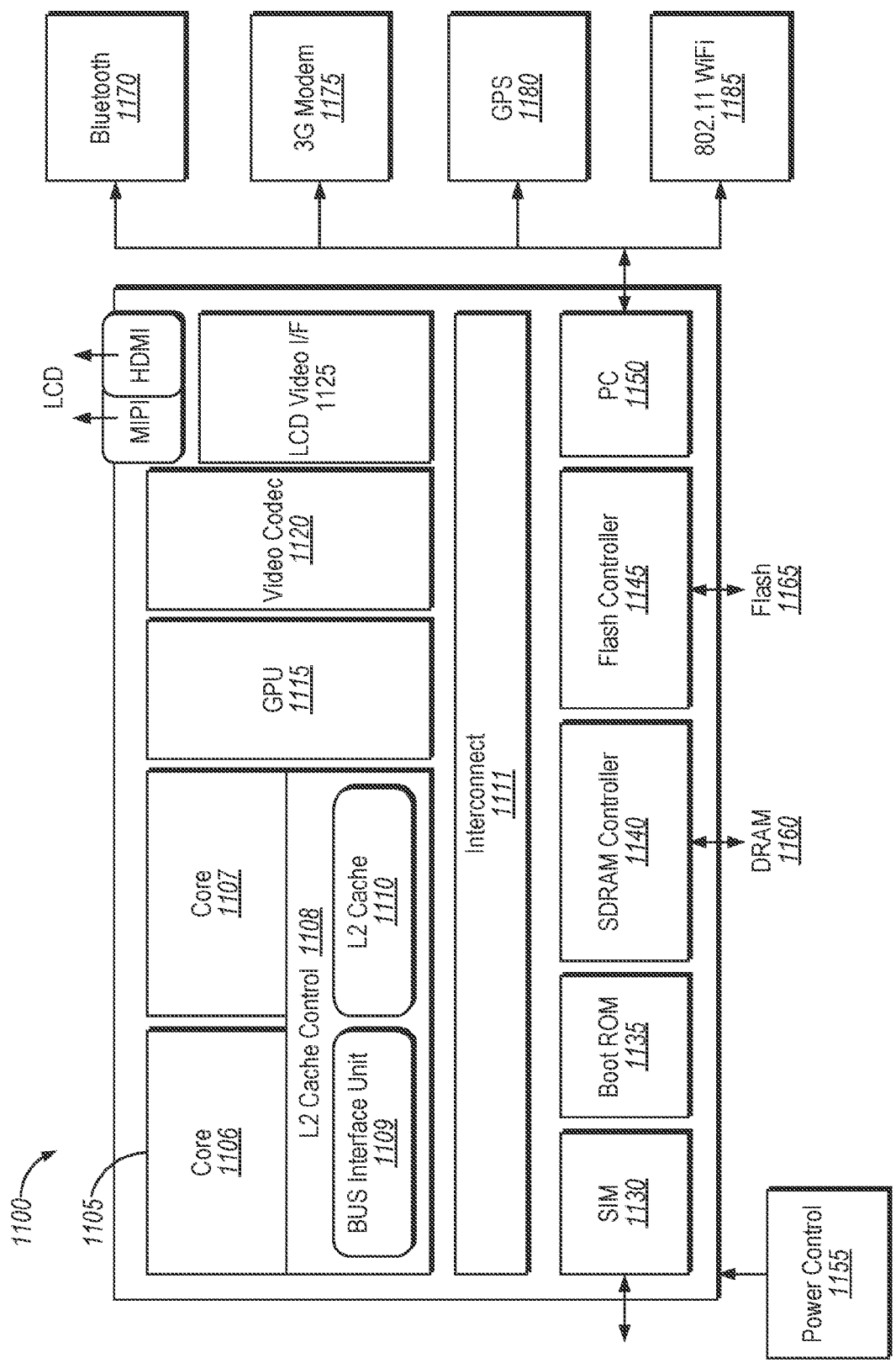
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting address space identifier management in complex input/output virtualization environments functionality as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
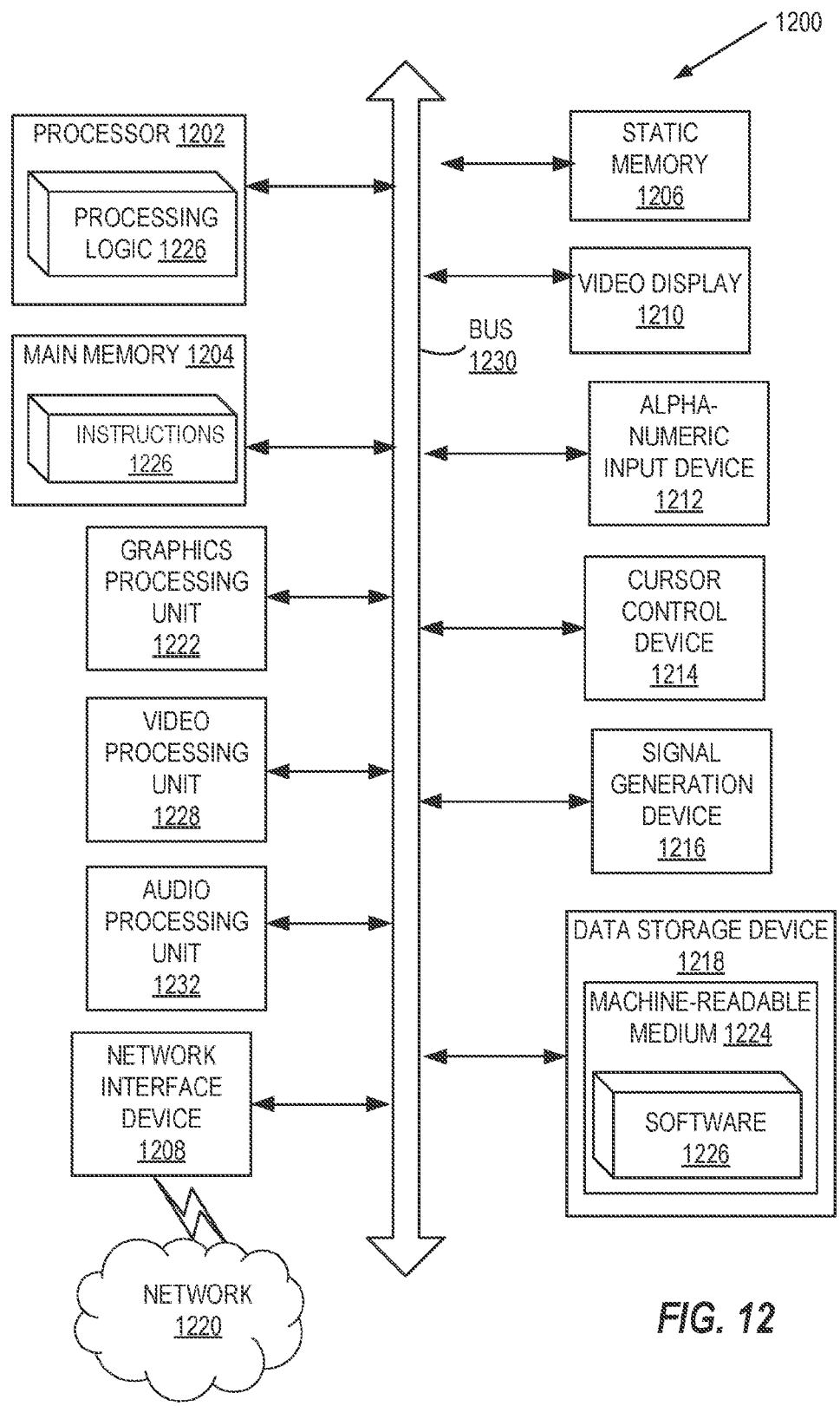
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting address space identifier management in complex input/output virtualization environments functionality as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing address space identifier management in complex input/output virtualization environments on threads in a processing device, such as processing device 100 of FIG. 1, as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing the ASID translation manager 180 on threads in a processing device such as described with respect to processing device 100 in FIG. 1, and/or a software library containing methods that call the above applications. While the non-transitory machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a memory controller; and
   a translation manager circuit coupled to the memory controller, the translation manager circuit to:
   receive a first workload instruction from a guest application, the first workload instruction comprising a first untranslated address space identifier (ASID) and a first workload for an input/output (I/O) device;
   translate the first untranslated ASID to a first translated ASID;
   insert the first translated ASID into a payload of the first workload instruction; and
   provide the payload to a work queue of the I/O device to execute the first workload based in part on at least one of: the first translated ASID or the first untranslated ASID.

2. The processing device of claim 1, wherein the translation manager circuit is further to set a flag in the first workload instruction indicating that the first translated ASID is valid.

3. The processing device of claim 1, wherein the translation manager circuit is further to:
   receive a second workload instruction from the guest application, the second workload instruction comprising a second untranslated ASID and a second workload for the I/O device; and
   responsive to detecting that a translation of the second untranslated ASID to a second translated ASID is not identified, generate an alert to cause an exit operation at the guest application.

4. The processing device of claim 1, wherein the first translated ASID of the first workload instruction is associated with an assignable interface (AI) of the I/O device for a direct memory access (DMA) request.

5. The processing device of claim 1, wherein the first untranslated ASID is associated with a virtual function of the I/O device assigned to the guest application.

6. The processing device of claim 1, wherein, to translate the first untranslated ASID to the first translated ASID, the translation manager circuit is further to:
 access a data structure associated with an application container;
 index, using the first untranslated ASID, the data structure to identify a translation table; and
 identify, using translation table, an address pointer pointing to the first translated ASID.

7. The processing device of claim 6, wherein the translation manager circuit is further to determine whether a control bit associated with a virtual machine control structure is enabled or disabled.

8. A method comprising:
 receiving, by a processing device, a first workload instruction from a guest application, the first workload instruction comprising a first untranslated address space identifier (ASID) and a first workload for an input/output (I/O) device;
 translating, by the processing device, the first untranslated ASID to a first translated ASID;
 inserting, by the processing device, the first translated ASID into a payload of the first workload instruction; and
 providing, by the processing device, the payload to a work queue of the I/O device to execute the first workload based in part on at least one of: the first translated ASID or the first untranslated ASID.

9. The method of claim 8, further comprising:
 setting a flag in the first workload instruction indicating that the translated ASID is valid.

10. The method of claim 8, further comprising:
 receiving a second workload instruction from the guest application, the second workload instruction comprising a second untranslated ASID and a second workload for the I/O device; and
 responsive to detecting that a translation of the second untranslated ASID to a second translated ASID is not identified, generating an alert to cause an exit operation at the guest application.

11. The method of claim 8, wherein the first translated ASID of the first workload instruction is associated with an assignable interface (AI) of the I/O device for a direct memory access (DMA) request.

12. The method of claim 8, wherein the first untranslated ASID is associated with a virtual function of the I/O device assigned to the guest application.

13. The method of claim 8, wherein, to translate the first untranslated ASID to the first translated ASID, the processing device is further to:
 access a data structure associated with an application container;
 index, using the first untranslated ASID, the data structure to identify a translation table; and
 identify, using translation table, an address pointer pointing to the first translated ASID.

14. The method of claim 13, wherein the processing device is further to determine whether a control bit associated with a virtual machine control structure is enabled or disabled.

15. A system comprising:
 a hardware input/output (I/O) memory management unit (IOMMU); and
 a processing device, operatively coupled to the IOMMU, to:
 receive a first workload instruction from a guest application, the first workload instruction comprising a first untranslated address space identifier (ASID) and a first workload for an input/output (I/O) device;
 translate the first untranslated ASID to a first translated ASID;
 insert the first translated ASID into a payload of the first workload instruction; and
 provide the payload to a work queue of the I/O device to execute the first workload based in part on at least one of: the first translated ASID or the first untranslated ASID.

16. The system of claim 15, wherein the processing device is further to set a flag in the first workload instruction indicating that the translated ASID is valid.

17. The system of claim 15, wherein the processing device is further to:
 receive a second workload instruction from the guest application, the second workload instruction comprising a second untranslated ASID and a second workload for the I/O device; and
 responsive to detecting that a translation of the second untranslated ASID to a second translated ASID is not identified, generate an alert to cause an exit operation at the guest application.

18. The system of claim 15, wherein the translated ASID of the first workload instruction is associated with an assignable interface (AI) of the I/O device for a direct memory access (DMA) request.

19. The system of claim 15, wherein the first untranslated ASID is associated with a virtual function of the I/O device assigned to the guest application.

20. The system of claim 15, wherein, to translate the first untranslated ASID to the translated ASID, the processing device is further to:
 access a data structure associated with an application container;
 index, using the first untranslated ASID, the data structure to identify a translation table; and
 identify, using translation table, an address pointer pointing to the first translated ASID.

* * * * *